United States Patent [19]

Surace et al.

[11] 4,429,666

[45] Feb. 7, 1984

[54] MOTOR VEHICLE HAVING AN INTERNAL-COMBUSTION ENGINE FITTED WITH MEANS FOR CONTROLLING THE AIR STREAM FLOWING THROUGH THE ENGINE COMPARTMENT

[75] Inventors: Filippo Surace; Giampaolo Garcea, both of Milan, Italy

[73] Assignee: Alfa Romeo Auto S.p.A., Naples, Italy

[21] Appl. No.: 364,314

[22] Filed: Apr. 1, 1982

[30] Foreign Application Priority Data

Apr. 6, 1981 [IT] Italy ............................. 20950 A/81

[51] Int. Cl.³ ............................................. F01P 11/10
[52] U.S. Cl. ............................. 123/41.05; 123/41.06
[58] Field of Search ............... 123/41.05, 41.06, 41.04, 123/41.7; 236/35.2, 35.3

[56] References Cited

U.S. PATENT DOCUMENTS 2,322,661 6/1943 Paton ................................ 236/35.2

FOREIGN PATENT DOCUMENTS 770647 3/1957 United Kingdom .

Primary Examiner—William A. Cuchlinski, Jr.
Attorney, Agent, or Firm—Charles E. Brown

[57] ABSTRACT

The invention relates to a motor vehicle driven by an internal-combustion engine housed in a compartment, the latter having at least one opening (24) through which the flow of air is controlled by a vane (22) which is operatively connected to means (25) sensing the temperature of the engine-cooling fluid.

1 Claim, 1 Drawing Figure

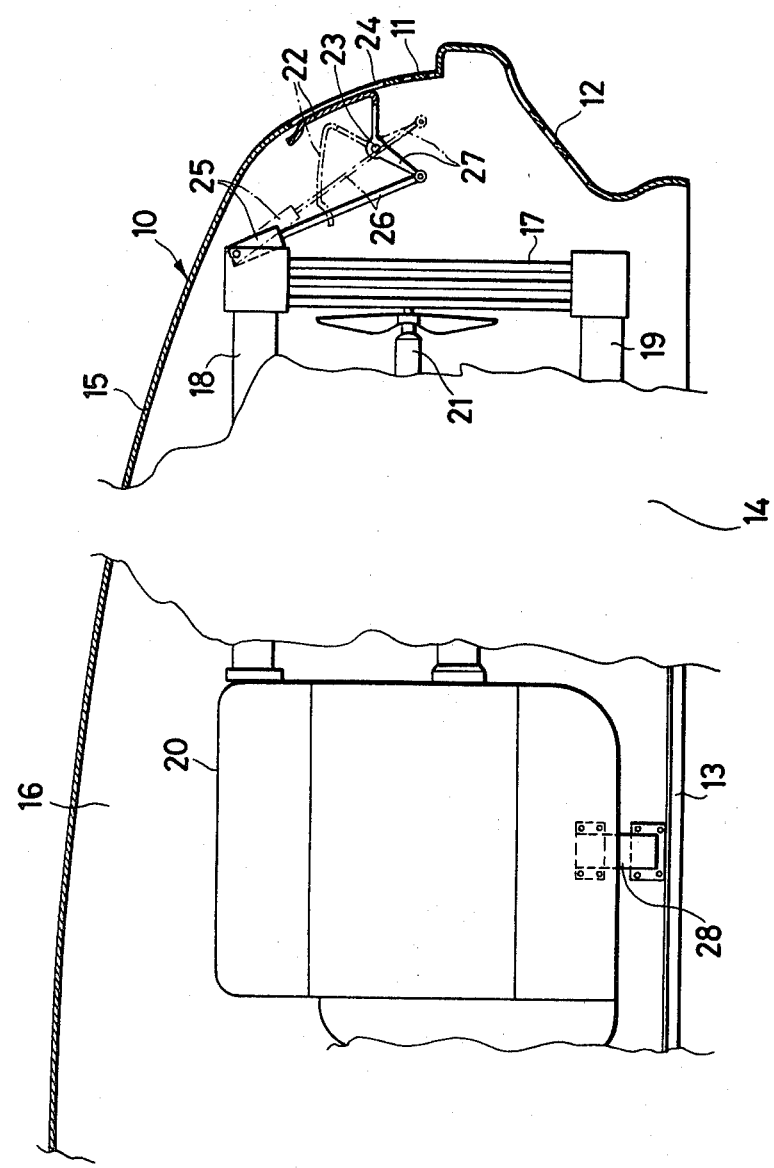

MOTOR VEHICLE HAVING AN INTERNAL-COMBUSTION ENGINE FITTED WITH MEANS FOR CONTROLLING THE AIR STREAM FLOWING THROUGH THE ENGINE COMPARTMENT

It is known that, in the motor-vehicles having a liquid-cooled internal-combustion engine, the quantity of heat transferred from the engine to the liquid coolant is gradually dissipated into the environmental air by means of a radiator: the latter consists of a bundle of gilled tubes, the gills of which are more or less crowded, through the interior of which the liquid coolant flows whereas their external surface is swept by an air stream which flows transversally between the tubes of the bundle. It is likewise known that, as a rule, a thermostatically controlled valve is inserted in a certain point of the loop, for example at the exit of the engine, for providing to maintain the temperature of the liquid coolant to a certain preselected value which is deemed to the optimum for a correct engine operation. Said valve throttles the liquid stream flowing through the radiator as the temperature tends towards dropping relatively to the preselected temperature, whereas the rate of flow is allowed to be increased if the contrary phenomenon occurs: as a result, the quantity of heat yielded by the liquid coolant to the environmental air is decreased, or increased, respectively. In addition to such an expedient, the quantity of heat transferred by the liquid coolant to the air is varied by modifying the rate of flow of the air flowing across the radiator tube bundle.

It is known that the latter rate of flow of air is usually originated by the pressure differential taking place on the radiator because the radiator is arranged transversally in a space of the vehicle, said space having one or more air intake ports formed in a pressural area of the aerodynamic body which surrounds the vehicle and one or more outlet ports placed in area in which a negative pressure obtains, or, at any rate, in areas wherein the pressure is lower than that obtaining at the intake ports.

By so doing, the rate of flow of the air is virtually proportional to the speed at which the vehicle runs. At low speeds, especially under certain conditions of environment and use, the rate of flow of the air would generally be inadequate: in order to meet the demand under such conditions of use, the magnitude of the rate of flow of the air is usually increased by means of a fan, the latter being specially provided therefor.

Considerations of the same kind hold good also for an air-cooled engine. Cooling systems are known for engines, in which a grid having movable slats is adopted to vary the rate of flow of the air which flows across the radiator.

As compared with the conventional systems, the invention disclosed in the present specification has the advantage of decreasing the aerodynamic drag for the vehicle running at a high speed, while permitting that the engine may efficiently be cooled under very heavy duty conditions.

In connection with the drag opposing the vehicle advance, it should be recalled that the magnitude of the power which is lost due to the drag, $N_a$, is expressed by the relationship:

$$N_a = C_x \cdot \zeta \cdot S \cdot W^3 \qquad (1)$$

wherein $C_x$ is the drag coefficient which takes a value which is the lower, the more appropriate is the external configuration of the vehicle from the aerodynamic standpoint, $\zeta$ is the density of the environmental air, S is the surface of the area of the vehicle main section and W is the speed of advance. However, inasmuch as there is, as outlined above, an internal compartment in the vehicle which communicates with the outside through an inlet port and an outlet port (generally beneath the vehicle), this compartment has a rate of flow of air flowing therethrough due to the effect of a pressural field around the vehicle, so that to the lost power $N_a$ aforementioned an additional power loss is to be added, which can be expressed as:

$$N_r = K \cdot \zeta \cdot A \cdot W^3 \qquad (2)$$

wherein K is a coefficient the value of which is the ratio between the pressure differentials at the inlet and the outlet (due to the aerodynamic field), and the dynamic pressure ($\frac{1}{2} \cdot \zeta = W^2$) whereas A is the area of the flow cross-section for the air in the interior of the vehicle compartment.

The value of $N_r$ is not at all negligible with respect to $N_a$ because the radiator is arranged crosswise in the compartment interior so that the inlet ports, the flow cross-sections and the outlet ports must be so largely sized as to ensure the necesary removal of heat from the liquid coolant even under the heaviest conditions of service of the vehicle from this particular standpoint, such as very high environmental temperatures, low advance speed, a high expenditure of power (steep hills, taking in tow). Such an oversizing of the ports aforementioned to match so heavy conditions of use of the vehicle is unjustified, however, over the remaining field of use of the vehicle because, especially at the highest speeds, the drag is worsened since $C_x$ is increased so that the power loss $N_r$ grows. Just in order that excessive and unjustified increases of the drag and the power loss $N_r$ may be prevented under normal conditions of use, it has been envisaged according to the present invention, to equip the compartment in which the radiator is housed, or the engine is housed in the case of an air-cooled engine, with airflow passage ports having movable slats formed through the compartment walls themselves and consisting, for example, of the external sheet metal of the car body. By so doing, the aerodynamic field which is optimized relative to drag, remains unaltered in the majority of the conditions of use because the slats remain closed, or partially closed, and the profile of the vehicle is not modified, whereas the aerodynamic field and the vehicle outline are worsened due to the opening of the slats only under the conditions of use in which the engine cooling problem predominates.

According to a preferred embodiment, the vehicle front section has at least a movable slat of sheet metal which automatically controlled by thermostatic means which sense the engine temperature so as to unmask at least a port for allowing the air to enter the compartment in which the radiator and/or the engine is housed.

Inasmuch as the thermostatic means aforementioned command the opening of a slat above a certain threshold temperature, the suggested approach has the additional advantage of limiting the fuel consumption in the cold starting stage and engine warm-up, since, under these conditions, it permits that the rate of flow of the radiator cooling air may be reduced so that the engine may be more quickly warmed up.

What has been said hereinabove is better explained with the aid of the accompanying drawing, the single FIGURE of which is a diagrammatical exemplary and non-limiting showing of a preferred embodiment of the invention.

The drawing shows in part the longitudinal cross-sectional view of a motor vehicle having a moving slat according to the invention. In the drawing, the numeral 10 indicates the wall, generally made of sheet-metal, which defines the front section of the car and which has fixed ports 11 and 12 for allowing the flow of air. At 13 indicates a car body cross member which, together with the sheet metal of the front section confines an air outlet port, the latter being indicated at 14. At 15 there is indicated the lid of the engine housing 16 and 28 is the engine lug. The drawing also shows the radiator 17 with the inlet and outlet conduits 18 and 19, respectively, for the water which cools the engine 20. At 21 is indicated an electric fan which is automatically controlled by a thermostatic device, the latter being not shown because it is conventional.

At 22 a moving slat is indicated, which is pivoted at 23 to the front section 10 of the vehicle and can be swung so as to shut, to throttle or to completely unmask the additional air inlet port 24 as formed through the wall of the front section 10. At 25 a thermostatic element is shown, for example of the wax expansion type, the expansion being a function of the temperature of the liquid coolant in the inlet conduit to the radiator 17, said element being operatively linked to a rod 26 which, in its turn, is pivoted to the two-armed lever 27 integral with the moving slat 22.

As the engine is started, that is, when the engine and the liquid coolant are cold, the moving slat 22 is held closed by the thermostat 25 because it is required, with a view to a quick engine warm up, that the cross-section of the inlet port for the engine-cooling air is at a minimum (fixed ports 11 and 12).

If, with the engine under steady conditions from the thermal point of view, the car is used at a high environmental temperature, at a moderate speed of advance or with a high power expenditure (steep hills, towing), the engine-cooling liquid attains and exceeds a threshold temperature which controls the thermostat 25 so that the latter opens the moving slat 22 and unmasks the additional air inlet port 24: thus the rate of flow of air across the radiator 17 is increased.

If the environmental and use conditions are such that the temperature of the liquid coolant exceeds a second threshold value which is somewhat above the first threshold value, the electric fan 21 enters action and boosts or increases further the rate of flow of air across the radiator and sweeping the engine, until such time as the temperature of the liquid drops below said second threshold value.

The drawing shows the case in which the front section of the vehicle has the fixed ports 11 and 12 and the additional port 24 normally closed by the moving slat 22 for allowing air to flow across the radiator.

However, the case can be foreseen in which the vehicle front section has no fixed ports and is equipped, conversely, with a single port having a moving slat for providing the flow of all the air intended to pass across the radiator. In such a case the moving slat may completely shut the relative port during engine warm up so as to accelerate this stage, whereas, under all the other conditions of use of the engine, the moving slat will unmask a flow passage area of variable cross-section as a function of the temperature of the engine liquid coolant.

We claim:

1. A motor vehicle front body portion defining an engine compartment, said engine compartment including a front portion and a rear portion, an engine mounted in said rear portion and an air cooled radiator for said engine mounted in said front portion, said front body portion being in the form of a shell and having a rounded front part extending above and below said radiator, said front body portion being open at the bottom thereof between said radiator and said grill for the discharge of air, and said rounded body front part having air flow means for the flow of cooling air through said rounded body front part to and through said radiator, said air flow means including constantly open air ports for directing normally required cooling air to said radiator, and an additional air port formed in said rounded body front part above said normally open air ports and in horizontal alignment with said radiator, said additional air port generally lying in a primarily vertical plane, a closure slat normally aligned with said additional air port and generally forming a part of the contour of said rounded body front part, mounting means pivotally mounting said closure slat for pivoting from its body contour forming position closing said additional air port to a generally horizontal out of the way position, and a thermostatically activated device carried by said radiator and coupled to said mounting means to selectively position said closure slat in accordance with the temperature of engine coolant.

* * * * *